US012698161B2

(12) United States Patent
Habenschaden et al.

(10) Patent No.: US 12,698,161 B2
(45) Date of Patent: Aug. 4, 2026

(54) APPARATUS FOR TRANSPORTING CONTAINERS WITH SENSOR FOR POSITION MONITORING

(71) Applicant: KRONES AG, Neutraubling (DE)

(72) Inventors: Nina Habenschaden, Regensburg (DE); Harald Effenberger, Schierling (DE); Thomas Hoellriegl, Teublitz (DE)

(73) Assignee: KRONE AG, Neutraubling (DE)

( * ) Notice: Subject to any disclaimer, the term of this patent is extended or adjusted under 35 U.S.C. 154(b) by 266 days.

(21) Appl. No.: 18/381,996

(22) Filed: Oct. 19, 2023

(65) Prior Publication Data

US 2024/0132296 A1 Apr. 25, 2024
US 2024/0228178 A9 Jul. 11, 2024

(51) Int. Cl.
*B65G 43/02* (2006.01)
*B65G 47/86* (2006.01)

(52) U.S. Cl.
CPC ........... *B65G 43/02* (2013.01); *B65G 47/842* (2013.01); *B65G 2203/0283* (2013.01); *B65G 2203/042* (2013.01)

(58) Field of Classification Search
CPC ................. B65G 43/02; B65G 47/842; B65G 2203/0283; B65G 2203/042
USPC ...................................................... 198/502.1
See application file for complete search history.

(56) References Cited

U.S. PATENT DOCUMENTS

| | | | |
|---|---|---|---|
| 10,265,906 B2 * | 4/2019 | Gerhards | ............ B29C 49/4236 |
| 2011/0064555 A1 | 3/2011 | Stoiber et al. | ............. 414/751.1 |
| 2020/0031510 A1 | 1/2020 | Yoshikane | .............. B65B 43/50 |

FOREIGN PATENT DOCUMENTS

| | | | | |
|---|---|---|---|---|
| DE | 102009043984 | | 3/2011 | ............. B65G 47/86 |
| EP | 43170332 | * | 2/2024 | |
| JP | 202294070 | | 6/2022 | ............. B65G 47/86 |
| WO | 2020128405 | | 6/2020 | ............. B65G 43/02 |
| WO | WO202128405 | * | 2/2021 | |

OTHER PUBLICATIONS

Extended European Search Report issued in EP Patent Appln. Serial No. 23200210.5-1017, dated Mar. 18, 2024, with machine translation, 11 pages.
Search Report issued in German Patent Appln. Serial No. 10 2022 127 522.1, dated Jun. 26, 2023, with machine translation, 9 pages.

* cited by examiner

*Primary Examiner* — Gene O Crawford
*Assistant Examiner* — Lester Rushin, III
(74) *Attorney, Agent, or Firm* — HAYES SOLOWAY P.C.

(57) ABSTRACT

The apparatus for transporting containers with a movable and in particular rotatable carrier which has a plurality of changeable holding devices for holding the containers during transport, wherein the apparatus has at least one sensor device which detects and/or monitors a position of the holding device, in particular after a change of the holding devices. According to the invention, the apparatus has an assignment device which assigns at least one measured value detected by the at least one sensor device to at least one and preferably to each holding device.

7 Claims, 2 Drawing Sheets

30    6                    8        8

APPARATUS FOR TRANSPORTING CONTAINERS WITH SENSOR FOR POSITION MONITORING

BACKGROUND OF THE INVENTION

The present invention relates to an apparatus and a method for transporting containers. Within a system for treating containers, the containers are usually treated by several of treatment devices, wherein the transfer or transport from one treatment device to another in particular subsequent treatment device is performed by means of transport devices/transport wheels.

These transport devices have holding devices for holding the containers, wherein the containers are, in particular, transferred from a holding device of the transport device to a holding device of a treatment device. Since this transfer takes place at very high speed, an exact adjustment of the holding devices and in particular also of the holding devices relative to one another is necessary in order to avoid damage to the containers and/or the holding devices, or collisions between the holding devices. It is therefore also necessary to check the transfer points regularly.

In a container treatment machine, there is a plurality of handling systems for containers such as bottles, cans or preforms. Usually, neck handling systems with transfer starwheels or a linear transfer system are used for PET stretch blow molding machines which are equipped with grippers or clamps. In a product change, the grippers or clamps are usually exchanged using quick-change systems and checked only visually before the machine is started up. If after the change a problem occurs with the adjustment of the gripper system in this context, there is, within the applicant's internal prior art, a readjustment using auxiliary means, e.g., a dial gauge, caliper gauge or feeler gauge.

However, such a procedure is disadvantageous since it is possible for errors to occur in setting up or adjusting the units when the gripper systems are changed by the operating personnel. However, the errors are only noticed when the machine is started up, and the machine must be run partially empty in order to be able to readjust the gripper systems. If a unit becomes loose or misaligned only during operation, this is usually noticed too late, and a malfunction or loss of production occurs due to defective or damaged parts.

From WO 2020/128405 A1, for example, an apparatus is known in which a distance of two jaws of a clamp from a fixed reference point is measured with a distance sensor, and the position of the clamp is deduced therefrom.

The present invention is therefore based on the object of providing an apparatus and a method with which simplified and reliable position monitoring of the holding devices is made possible.

SUMMARY OF THE INVENTION

The invention therefore directed to an apparatus for transporting containers that has a movable and in particular rotatable carrier which has a plurality of changeable holding devices for holding the containers during transport, wherein the apparatus has at least one sensor device which detects and/or monitors a position of the holding device, in particular after a change of the holding devices.

According to the invention, the apparatus has an assignment device which assigns at least one measured value detected by the at least one sensor device to at least one and preferably to each holding device.

The assignment can preferably take place in a suitable manner.

One option is, for example, by defining or establishing a zero point. For example, this zero point can be established on a drive device or a motor of the carrier, whereby a direct assignment to a holding device can take place that is located at this zero point. All further holding devices can then be subsequently defined.

A further option for assignment is, for example, to attach an additional element to a holding device (usually the holding device with the assignment no. 1), which element can preferably be detected with a further sensor device, such as an inductive sensor, for example. This holding device accordingly serves as a reference holding device. The further sensor device is preferably located at the same location as the measuring device with the first sensor device so that the signal can determine when the reference holding device is being measured, and the assignment can accordingly take place. The additional element on the holding device can, for example, simply be a higher screw. Accordingly, after each revolution, it can be detected when the reference holding device has passed by again. All further assignments are then made in ascending order according to the arrangement of the holding devices.

The recorded measured values and the holding device to which they belong can preferably be output on a display device so that a system operator can check and monitor the values. The measured values are preferably recorded and checked continuously during operation. Measured values which do not correspond to the target values can, for example, be represented on the display by a different color or the like so that the corresponding deviating values can be seen directly, and the defective parts can be replaced.

Accordingly, it is proposed according to the invention to provide at least one sensor device which detects a position of the holding devices, and also to make an assignment so that which measured value was detected at which holding device can be identified.

The proposed invention accordingly facilitates the changing and the subsequent setting-up of the holding devices, wherein in particular, no additional measuring means are necessary for setting up the new holding devices. A saving in time when changing and setting up the holding devices can thereby also be achieved. In this case, a monitoring of the adjustment can also be carried out after the change and restarting of a machine after a standstill so that a simple detection of defects or wear of individual holding devices can also be detected. In addition, whether the correct holding device has been installed can also be checked, for example by the thickness of the holding device, in particular the clamp. Depending on the customer object (preform/bottle), different holding devices are used which have a different shape depending on the mouthpiece. For different holding devices having the same thicknesses, for example, an individual milled feature or a coding could be applied so that an assignment can take place. Accordingly, the thickness of the holding device or an individual marking can preferably be measured, and the holding device which must be used with the customer object in question can be adjusted in the control system.

Advantageously, the proposed apparatus can also be installed as an external evaluation unit if the customer so wishes.

The apparatus for transporting containers is preferably a transport device with a rotatable carrier and an essentially circular transport path along which the containers are transported. "Essentially" means that the circular path can even differ from the circular path by a few degrees, for example ±5°.

The holding devices are preferably arranged at regular intervals on a circumference of the carrier. Alternatively, the holding devices could also be arranged at irregular intervals. Preferably, the holding devices are fixed (stationary) or pivotably arranged. The holding devices are preferably pivotably arranged on the carrier of the transport device. The holding devices advantageously hold the containers on their circumference, wherein the holding devices surround the circumference of the containers by at least 270°, preferably by at least 250°, preferably by at least 220°, and particularly preferably by at least 180°. The holding devices preferably hold the containers below or above the support ring.

The holding devices are preferably gripping devices or clamps. In this case, a check is preferably also made as to whether the measured values lie within predetermined values or correspond to target values and the holding devices therefore have a predetermined or fixed position, and additionally whether the correct holding devices are used. For this purpose, the apparatus preferably has an evaluation and/or control device which accordingly evaluates the measured values, for example by comparison with target values.

As a result of the above-mentioned assignment, an identification is possible in particular of which holding device is, for example, defective or is arranged in an incorrect position. An automated check and/or monitoring of the position of the individual holding devices is accordingly made possible using the at least one sensor device.

Preferably, sensor devices for position determination are integrated in each apparatus for transporting containers that is contained in the overall system in order to check a previously determined or fixed position. The apparatus for transporting is advantageously a transfer starwheel.

By means of the at least one sensor device, it is accordingly possible, for example, to measure a height deviation of the holding device in the course or in the circumference of the transport device and relative to one another. Preferably, one or more measuring points which serve as reference points for the measurements are established on the apparatus itself and/or in the environment of the apparatus.

With a further sensor device, a thickness of the holding device or clamp can preferably also be measured. In this case, a first sensor preferably measures the position of the holding device from below, and a second sensor measures the position from above. It can accordingly be measured whether the correct clamp is being used for the corresponding customer object. For example, in an initial round before the start of production, these values can then be compared. Collisions due to incorrect holding elements can thus be prevented.

The recorded measured values are noted manually or preferably saved and displayed in the machine control system during type selection. Accordingly, the machine operator also has control over how far the correct holding devices or, for example, the correct height of each individual holding device has been set. Even in the case of production expansion, the new holding devices can be precisely adjusted on each transport device, preferably without additional measuring means.

In a preferred embodiment, the apparatus has a plurality of sensor devices. A measured value can be assigned to each individual holding device by querying the sensor devices. The position of each individual holding device after a product change can therefore be precisely checked by the plurality of sensor devices.

Preferably, the sensor devices are arranged below the holding devices as viewed from the center of the earth. However, it is also conceivable that the sensor devices are arranged above the holding devices as viewed from the center of the earth.

Preferably, a separate sensor device is assigned to each holding device. The plurality of sensor devices is preferably moved with the holding devices. The sensor devices are preferably arranged on a carrier which is arranged below or above the holding devices and is preferably designed to be rotatable and in this way is moved with the carrier of the transport device and accordingly with the holding devices.

If an own sensor device is assigned to each holding device, the assignment of the measurement results to the corresponding holding device will also be simplified since, for example, it is known which sensor belongs to which holding device and has accordingly detected the measured value at the respective holding device. In this case, the measured value is assigned to the holding device by the direct assignment of the sensor device to the respective holding device so that the measured value can also be assigned directly to the holding device.

The position of the holding devices is preferably detected before a production start when the holding devices preferably are not holding any containers. Accordingly, for example after a change of the holding devices, when there is a deviation of the setting of the holding devices, a message can preferably be output from a machine control system before the start-up in order to prevent damage to components. However, a detection of the measured values during production is preferably also possible when the holding devices have accordingly picked up the container.

In this case, the sensor devices are preferably permanently active and continuously measure or detect the position of the holding devices. Advantageously, the measured value is detected at specific time intervals.

Preferably, it is possible for the apparatus to also have a plurality of sensor devices, but an own sensor device is not assigned to each holding device. In this embodiment, the plurality of sensor devices is preferably arranged in a stationary manner on the apparatus and is preferably permanently installed on the apparatus, wherein a carrier can also be provided for this purpose below or above the holding devices on which the sensor devices are arranged. In this case, the assignment device assigns the respectively detected measured value of the corresponding holding device so that an incorrectly positioned holding device can be identified. Which measured value was measured at which holding device is preferably output on a display device. The holding devices themselves have unique numbers, barcodes or the like in order to be identifiable. Advantageously, the display device outputs a pictorial representation of which of the holding devices has an incorrect or deviating position.

Advantageously, the sensor devices are only arranged in a specific (angular) region of the apparatus, for example a region of the transport device in which the holding devices are not holding containers.

The sensor devices are preferably selected from a group of sensor devices which includes distance sensors, position sensors, location sensors, optical sensors, electromagnetic sensors or the like. Particularly preferably, the position of the holding devices is detected in a contactless manner. The sensor device preferably transmits an electromagnetic, optical or acoustic signal which is preferably recorded by a detection device and is forwarded to the above-mentioned display device or to an evaluation device.

The measured value detected by the sensor device is, for example, a value, a distance or a height between a predetermined point on the holding device and a fixed reference point, wherein the reference point can preferably be the sensor device or the installation location of the sensor device. If the measured value lies within predetermined values or ranges or target values, the position of the holding device is preferably correct. If the measured value lies below or exceeds the predetermined values or ranges, the position is incorrect, which could lead to an error and/or damage during the transfer.

The sensor devices are preferably arranged below the holding devices or the apparatus and/or laterally to the holding devices. The sensor device preferably detects a distance of the holding device from the sensor. In the case of stationary sensor devices, this distance is detected while the holding device is passing the sensor. A distance between the holding device and the sensor device is preferably detected in the vertical direction. If this distance does not correspond to predetermined target values, the holding device is not in the correct position.

In the case of a lateral arrangement of the sensor device, a distance between the sensor device and the holding device is correspondingly detected in the horizontal direction. Preferably, the apparatus preferably has at least two sensor devices for position detection which detect the position of a holding device in the vertical and horizontal directions. Preferably, two sensor devices can also be assigned to each holding device.

In a preferred embodiment, the apparatus has a control device which is suitable and intended to adjust the position of the holding devices depending on the detected measured value. This adjustment is preferably a readjustment of the position of the holding device. Integration into the machine control system enables complete monitoring of each individual unit or holding device and therefore monitoring of the machine. If there is a deviation in the position (height, timing, etc.), a stop can take place or, if technically possible, an automatic readjustment as well. Preferably, missing holding devices can also be detected in this way.

The control device adjusts the position of the holding devices in particular when it can be deduced from the detected measured value that the position of a holding device does not correspond to a predetermined or fixed position or to a target value. The sensor device is preferably suitable and intended for transmitting measured values to the control device. Preferably, the control device regulates the position of the holding device depending on a result of a comparison device which compares the detected measured value with saved target values.

In a preferred embodiment, the control device therefore has a memory device in which a plurality of target values is saved.

In a further preferred embodiment, the memory device is a cloud. The memory device is therefore preferably a non-volatile memory device, preferably an external memory device and in particular a cloud-based memory device and/or an external server (including a memory device), wherein the memory device is accessed in particular via the internet (and/or via an in particular at least partially wired and/or wireless, public and/or private network). An external server is to be understood in particular as an external server, in particular a backend server, in relation to a container inspection device (such as the present checking of the holding devices).

The external server is, for example, a backend, in particular a container inspection device manufacturer or a service provider, which is configured to manage spatially resolved sensor data (in particular a plurality of sensor devices and/or a plurality of container inspection devices) and/or to adjust container inspection devices. The functions of the backend or the external server can be carried out in (external) server farms. The (external) server can be a distributed system.

In a further preferred embodiment, the control device has a comparison device which compares the detected measured values with the target values saved in the memory device. In this case, a comparison with target values and/or predetermined values or ranges is preferably carried out. The sensor devices therefore detect a measured value and compare it with saved target values.

In a preferred embodiment, the apparatus has an output device which outputs an error message when there is a deviation between the detected measured values and the saved target values determined by the comparison device. The output device can preferably also display the measured values in particular when there is a change of type so that these values can preferably be checked by an operator. In this case, a comparison can take place in the comparison device before being displayed, and critical values can be identified visually in the output device, for example, so that they can be immediately differentiated from non-critical values.

Preferably, the output device is therefore a screen, for example a touch panel, which is arranged on the apparatus. A signal light which lights up when the measured value does not correspond to the predetermined target values would preferably also be conceivable. An acoustic or visual warning message that the position of a holding device needs to be adjusted is preferably output to the operator.

In a preferred embodiment, the at least one sensor device detects and/or monitors the position of the holding devices during production. If a sensor device is assigned to each holding device, this monitoring can preferably be permanently active. If an own sensor device is not assigned to each holding device, checking will take place when the holding devices are passing the preferably stationary sensor devices. During production, each holding device located in the apparatus is preferably monitored.

In a further preferred embodiment, the at least one sensor device is fixedly arranged on the apparatus. A fixed arrangement is understood to mean that the sensor device(s) cannot be non-destructively removed from the apparatus. This fixed arrangement is advantageous since this prevents the adjustment or arrangement of the sensor, in particular the distance from the holding device, from being changed inadvertently. Preferably, the sensor devices are arranged fixedly on a carrier which is located above or below the transport device.

In a further preferred embodiment, the sensor devices are mobile sensor devices which are detachably arranged on the apparatus for the purpose of installation. Accordingly, the sensor devices are preferably arranged on the apparatus for arranging or adjusting the holding devices and then removed again. Such an adjustment can preferably also take place during each change-over process of the holding devices or once during the initial installation of the apparatus.

The present invention is further directed to a method for transporting containers along a predetermined transport path, wherein the containers are held on holding devices during transport, and a position of the holding device is detected and/or monitored by at least one sensor device.

According to the invention, at least one and preferably each holding device is assigned at least one measured value detected by the at least one sensor device.

Accordingly, it is also proposed according on the method side to provide at least one sensor device which detects a position of the holding devices, and also to make an assignment so that it can be identified which measured value was detected at which holding device.

In a preferred method, the detected measured values are compared with target values preferably saved in a cloud. Preferably, at least one cloud (as a memory device), or at least one cloud-based memory device is provided in which the target values are saved and the measured values are stored.

In a further preferred method, an error message is output in the event of a deviation in the comparison. It is preferably a message that is acoustically or visually perceivable by the machine operator.

In this case, the above-described apparatus is in particular configured and intended to carry out this described method, i.e. all mentioned features of the above-described apparatus are also disclosed for the method described in this context and vice versa.

Further advantages and embodiments result from the accompanying drawings.

DETAILED DESCRIPTION OF THE INVENTION

Figure 1:
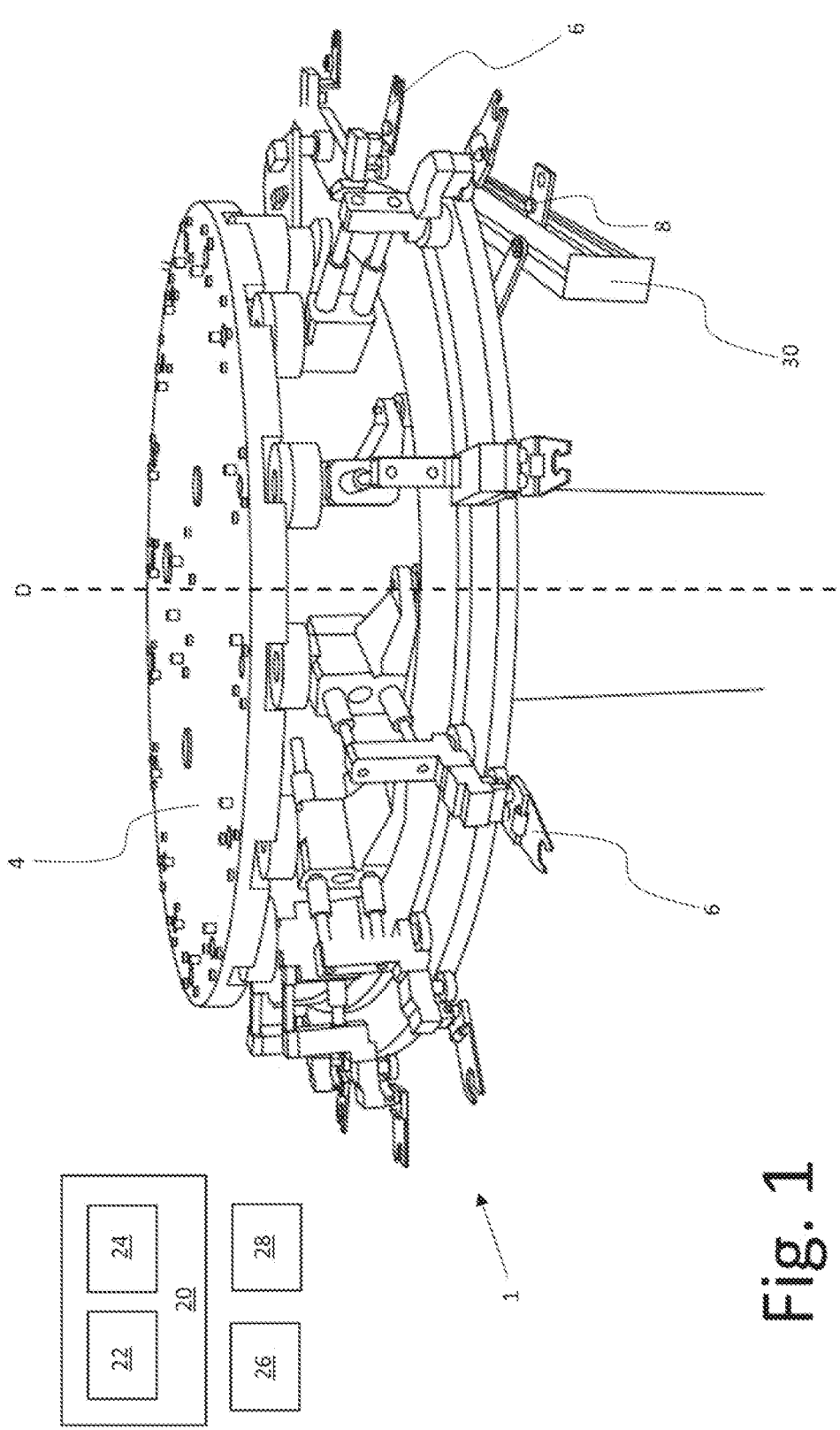
FIG. 1 shows a schematic view of an apparatus according to the invention.

FIG. 1 shows a schematic view of an apparatus 1 according to the invention. Here the apparatus 1 has a carrier 4 which is rotatable about the axis of rotation D and on which a plurality of holding devices 6 are arranged which hold containers (not shown) during transport.

The reference number 30 designates a carrier on which one or more sensor devices 8 are arranged, which monitor or detect the position of the holding devices 6 when they are passing the sensor devices 8. In the embodiment shown in FIG. 3, the sensor devices 8 are arranged in a stationary manner. As described above, however, it would also be conceivable for each holding device to be assigned an own sensor device and for these sensor devices to move accordingly with the holding devices. In this case, the carrier 30 would extend below or above the entire circumference of the apparatus 1.

The apparatus 1 according to the invention is therefore not limited to the embodiment shown in FIG. 1.

The reference number 20 designates schematically the control device which has a memory device 22 for saving target values and detected measured values and a comparison device 24 for comparing the measured values with the saved target values. The reference number 26 relates to an assignment device which assigns the measured values detected by the sensor devices 6 to the corresponding holding devices 8, and the reference number 28 relates to an output device which outputs or displays error messages or generally the measured values.

Figure 2:
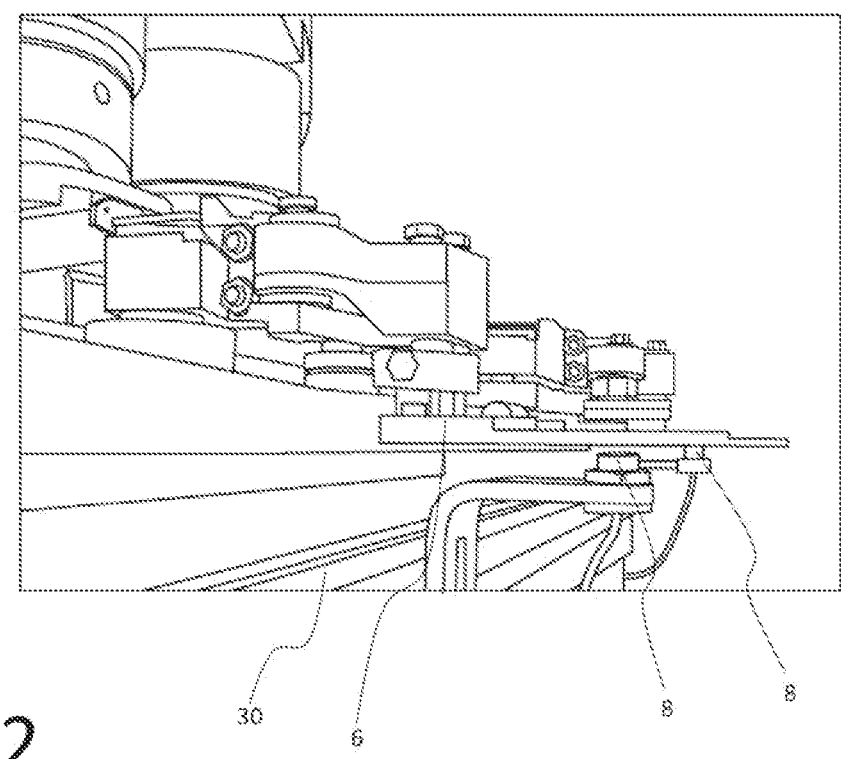
FIG. 2 shows a detailed view of the apparatus according to the invention shown in FIG. 1.

FIG. 2 shows a detail view of the apparatus according to the invention shown in FIG. 1. The sensor device 6 arranged below the holding device 8 can be seen in this illustration. This sensor device 6 can be a stationary or movable sensor device.

The applicant reserves the right to claim all features disclosed in the application documents as essential to the invention, provided that they are novel over the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

LIST OF REFERENCE SIGNS 1 apparatus
4 carrier
6 holding devices
8 sensor device
20 control device
22 memory device
24 comparison device
26 assignment device
28 output device
30 carrier
D axis of rotation

The invention claimed is:

1. An apparatus for transporting containers with a movable carrier, which comprises a plurality of changeable holding devices for holding the containers during transport, wherein the apparatus has at least one sensor device configured to detect and/or monitor a position of the holding device,
wherein
the apparatus has an assignment device configured to assign at least one measured value detected by the at least one sensor device to at least one holding device,
wherein
the apparatus has a control device which is configured to readjust the position of the holding devices in dependence on the detected measured value, and
wherein
the control device has a memory device in which a plurality of target values is saved and a comparison device configured to compare the detected measured values with the target values saved in the memory device and the apparatus has an output device configured to output an error message when there is a deviation between the detected measured values and the saved target values determined by the comparison device comparing the detected values with the target values saved in the memory device, and outputting an error message when there is a deviation between the detected measured values and the saved target values determined by the comparison device.

2. The apparatus according to claim 1,
wherein
the apparatus has a plurality of sensor devices.

3. The apparatus according to claim 1,
wherein
the memory device is a cloud.

4. The apparatus according to claim 1,
wherein
the at least one sensor device is configured to detect and/or monitor the position of the holding devices during production.

5. The apparatus according to claim 1, wherein the at least one sensor device is fixedly arranged on the apparatus.

6. The apparatus according to claim 1, wherein the sensor devices are mobile sensor devices which are detachably arranged on the apparatus for the purpose of installation.

7. A method for transporting containers along a predetermined transport path, wherein the containers are held on holding devices during transport, and a position of the holding device is detected and/or monitored by at least one sensor device, wherein at least one holding device is assigned at least one measured value detected by the at least one sensor device, wherein the detected measured values are compared with target values and an error message is output in the event of a deviation in the comparison, wherein the apparatus has a control device which is configured to readjust the position of the holding devices in dependence on the detected measured value, and wherein the control device has a memory device in which a plurality of target values is saved and a comparison device configured to compare the detected measured values with the target values saved in the memory device and the apparatus has an output device configured to output an error message when there is a deviation between the detected measured values and the saved target values determined by the comparison device, comparing the detected values with the target values saved in the memory device, and outputting an error message when there is a deviation between the detected measured values and the saved target values determined by the comparison device.

\* \* \* \* \*